United States Patent [19]

Ödmann

[11] 4,415,000
[45] Nov. 15, 1983

[54] T-JOINT FITTING

[75] Inventor: Gert O. Ödmann, Askim, Sweden

[73] Assignee: Gotaverken Motor U.S. Inc., Southfield, Mich.

[21] Appl. No.: 379,156

[22] Filed: May 17, 1982

[51] Int. Cl.³ .............................................. F16K 43/00
[52] U.S. Cl. ..................................... 137/318; 222/80; 285/197
[58] Field of Search .......................... 137/318; 222/80; 285/197; 251/225, 229, 265, 273

[56] References Cited

U.S. PATENT DOCUMENTS

| 3,840,255 | 10/1974 | Daghe | 285/197 |
| 3,983,897 | 10/1976 | Gebelius | 137/318 |
| 4,018,246 | 4/1977 | Langstroth | 285/197 |
| 4,261,384 | 4/1981 | Dahlbring | 137/318 |

FOREIGN PATENT DOCUMENTS 1070691  8/1954  France ................. 137/318

Primary Examiner—George L. Walton
Attorney, Agent, or Firm—Holman & Stern

[57] ABSTRACT

A T-joint fitting of the type having a two-part housing adapted to be clamped to a transport pipe is provided with a piston, which is axially displaceable within the housing for piercing a hole in the wall of the transport pipe. When the pipe is made of copper or similar soft material the axial movement is caused by a nut used for closing the passage in which the piston operates, the nut further being provided with an internally threaded bore, mating with a rearwardly extending, threaded bar on the piston. The threads on the bar and on the externally threaded portion of the housing, with which the nut cooperates, have the same pitch, but are oppositely handed, so that screwing on of the nut will simultaneously force the piston inwards. The two parts of the housing are clamped together by four bolts, and a packing of elastomeric material covers the part of the transport pipe to be pierced by the piston and has a waffle-textured face to turn towards the pipe.

3 Claims, 6 Drawing Figures

4,415,000

T-JOINT FITTING

BACKGROUND OF THE INVENTION

1. Field of the Invention

This invention relates to T-joint fittings of the type which are attachable to a fluid pipe and cut an opening therein.

2. Description of the Prior Art

There are many types of T-joing fittings, which are adapted to be attached to a fluid transporting pipe and make possible the attachment of a bleed-off pipe, without the necessity of emptying the transport pipe.

One such T-joint fitting is shown in U.S. Pat. No. 3,983,897, S.R.V. Gebelius, and comprises a two-part housing adapted to be tightly attached to a transport pipe. The housing encloses an axially displaceable piston, the front edge of which is shaped to cut a hole in the wall of the transport pipe, and to bring the chip removed from the wall to a recess in the housing.

When the transport pipe is made of steel, a considerable force is required to make the piston cut through the wall of the pipe. This force is obtained by the ignition of an explosive charge, or possibly by the stroke of a sledge hammer.

The use of an explosive charge makes it necessary to provide a strong housing, and it is also, otherwise, necessary to consider various safety regulations. A hard stroke may damage a soft-material tube.

SUMMARY OF THE INVENTION

The object of the present invention is to provide means for moving the piston through the wall of the transport pipe by mechanical actuation, while simultaneously ensuring a satisfactory sealing.

In a T-joint fitting having a two-part housing enclosing an axially displaceable piston with a cutting front end and a transverse flow passage the desired movement is brought about by the piston being forced against the pipe wall due to the action of a nut.

The piston is provided with a threaded bar located centrally at its back face, and the nut is provided with an internally threaded bore for cooperation with the bar. The threads on the bar and on the portion of the housing, with which the nut operates, have the same pitch, but are oppositely handed.

The conventional clock-wise on-screwing of the nut causes the bar to move inwards, so while the nut is fitted to close the passage enclosing the piston, the latter causes the desired opening in the tube wall in a steady and smooth axial movement.

The two parts of the housing are clamped together by means of two pairs of bolts located at opposite sides of the transport pipe. A packing of elastomeric material having a waffle-textured surface to be turned towards the transport pipe is fitted to cover the portion of the pipe, where the opening is to be cut, and is clamped between the two housing parts.

DESCRIPTION OF A PREFERRED EMBODIMENT

Figure 1:
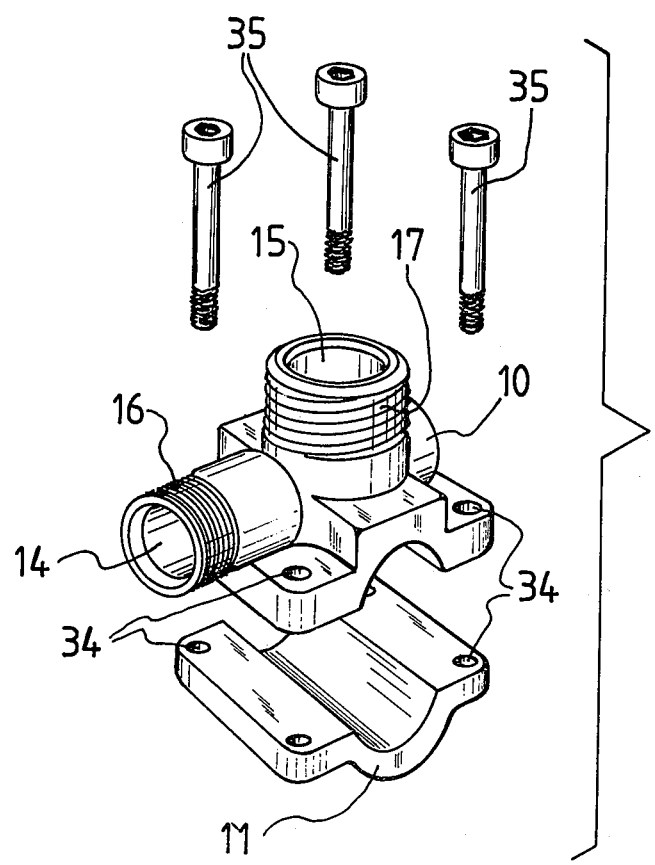
FIG. 1 is an exploded, perspective view of the housing of the fitting of this invention.

The T-joint fitting shown in FIG. 1 comprises two housing parts 10 and 11, when attached together form a passage fitting around a transport pipe 12, in the present case preferably made of copper. A gasket 13 of elastomeric material is fitted between the two housing parts, and covers the part of the transport pipe 12 located within housing part 10. Further features of the packing will appear below in connection with FIGS. 3 and 4.

The housing part 10 encloses a first operational passage 14 arranged transversely in relation to the longitudinal axis of the transport pipe, and a second passage 15 for connections to a branch pipe (not shown in the drawing).

The housing part 10 is formed with two outwardly threaded portions 16 and 17 enclosing the outward ends of the two passages.

The threaded portion 17 is adapted to cooperate with a nut (not shown) for fastening the branch pipe, above referred to. The other threaded portion 16 is adapted to cooperate with a nut 18, which, in use, closes the operational passage 14, and is also used to manipulate a piston member 19 enclosed in the operational passage.

The piston member 19 comprises a main body 20 through which a flow passage 21 is formed, and which is also provided with a groove 22 for a rubber packing 23, preferably of the O-ring type.

The flow passage 21 is arranged transversely with respect to the axis of the piston member, and will, in use, communicate the transport pipe 12 with the second passage 15. Instead of a bore through the body of the piston the passage may be formed as a groove in the envelope face of the body.

Figure 5:
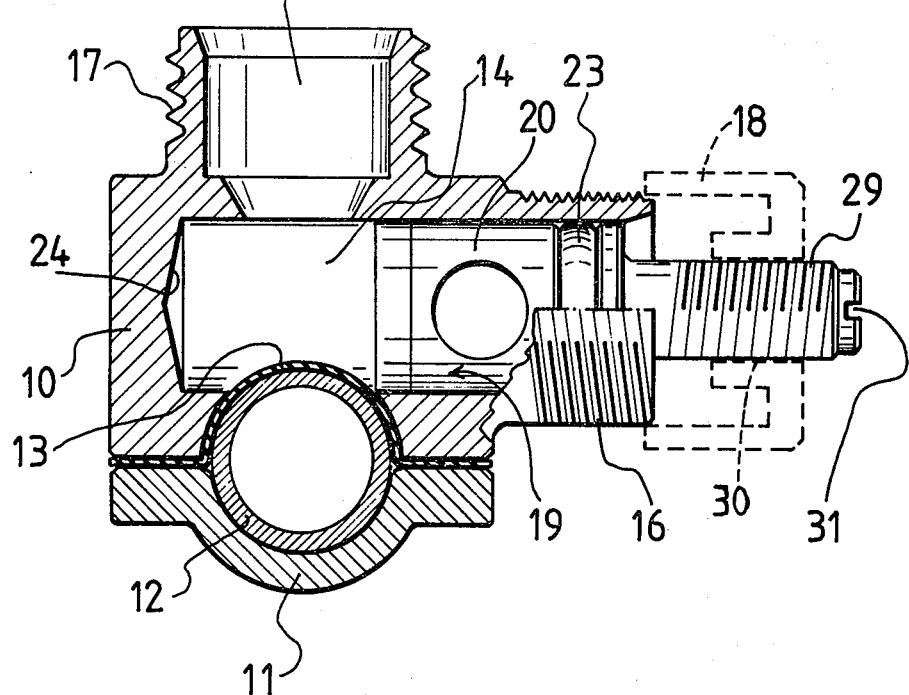
FIG. 5 is a cross-sectional view of a fitting according to the invention showing an initial stage of mounting on a transport pipe.
Figure 6:
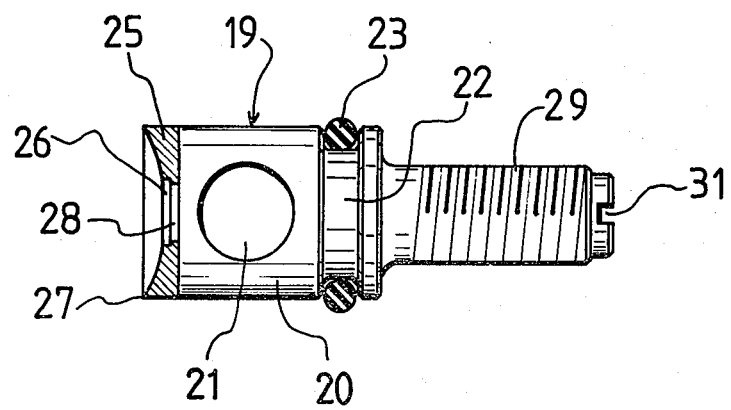
FIG. 6 is an elevational view, partly in section, of the piston shown in FIG. 5.

As is common with fittings of this type, the intention is that an axial displacement of the piston member shall, from the starting position shown in FIG. 5, cut a hole in the wall of the transport pipe. The chip cut out from the wall will be retained in a recess 24 forming the bottom of the operational passage 14.

The main body 20 of the piston will, in use, be located in close contact with the wall of transport pipe 12, but in order to provide a clean cut through the wall the cutting front edge of the piston member should preferably be made of steel. The front edge of the piston member is therefore formed as a steel cap 25, which has a vaulted cavity 26 surrounded by a sharp edge 27.

A central hole in the cap 25 may be fitted upon a stud 28 projecting from the main body, the stud being riveted or otherwise expanded to hold the cap.

A piston member as described will be cheaper than a piston member fully of steel, and will also show better corrosion resistance.

A threaded bar 29 extends from the face of the piston member remote from the cap 25, and has sufficient length to ensure that the piston member reaches the desired position, in which it has cut a hole in the wall of the transport pipe.

The nut 18 is provided with conventional internal threads for cooperation with the housing at portion 16, but has also a central, internally threaded bore 30, mating with the bar 29.

With a right-handed threading at portion 16, the bar 29 has left-handed threads. The pitch is the same on both parts, and the screwing on of the nut will make the bar 29 push the piston member inwards, thus smoothly cutting the desired hole in the wall of the transport pipe. This inward movement will also cut a corresponding opening in gasket 13.

In the final position, flow passage 21 will be aligned with the second passage 15. Due to friction there may occur a slight turning of the piston member about its longitudinal axis. This may be checked by controlling the position of a groove 31 at the end face of the bar 29. The groove 31 is preferably parallel with the axis of the flow passage, and shall, to ensure fully open flow passage, be positioned transversely to the transport pipe.

The position is easily adjusted by means of a screwdriver. The groove 31 arrangement may further be used for causing a throttling of the flow to the branch pipe.

Figure 2:
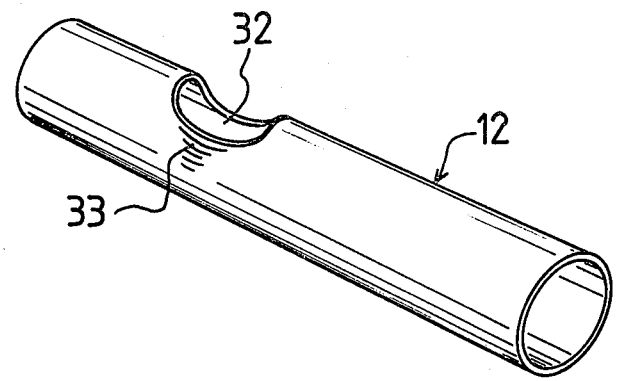
FIG. 2 is a perspective view of a length of a transport pipe in which an opening has been cut by the operation of this invention.

As is indicated at the length of transport pipe 12 shown in FIG. 2, the movement of the piston to cut the opening 32 may cause a slight indentation 33 in the wall before it starts to cut at the wall.

This indentation may cause a tendency to leak, and it is generally necessary to provide a good sealing around the opening 32. One prerequisite is that the two housing parts by firmly clamped to the pipe. The two parts are provided with mating bores 34 for two pairs of bolts 35 (only three are shown in FIG. 1), the bores in housing part 11 being threaded.

The packing 13 has sufficient size to cover the part of the pipe fitting into the cavity in housing part 10, and to extend outwardly into the interspace between the housing parts, where the bolt holes 34 are located.

Figure 3:
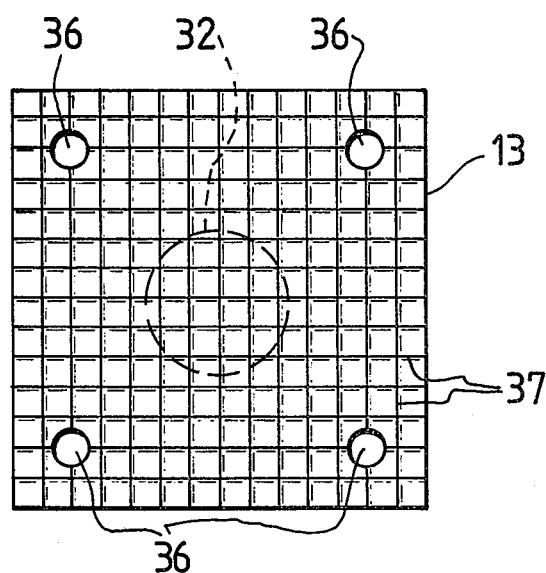
FIG. 3 is an elevation view showing a sheet of packing, used in this invention as viewed from the side to be turned towards the transport pipe.
Figure 4:
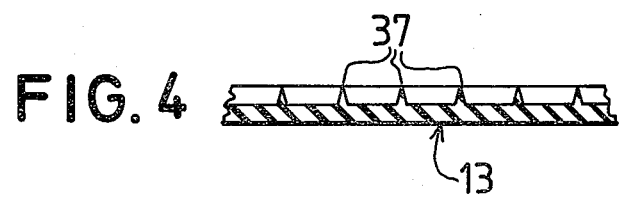
FIG. 4 is a cross-sectional view, on a larger scale, of a portion of the packing of FIG. 3.

As is indicated in FIG. 3 the packing 13 may have holes 36 for the bolts 35 located so as to ensure a slight stretching of the packing already before the tightening of the bolts.

An important feature is that the face of the packing 13 to be turned towards the pipe is provided with a crisscross pattern of ridges 37 to form a waffle pattern.

When the bolts are tightened the ridges will be compressed, and the interspaces will, together, form a labyrinth, which efficiently prevents the escape of fluid.

The ridges must not necessarily intersect at right angles, or be located so as to be parallel and transverse to the longitudinal axis of the pipe, respectively, as any kind of checkered or honeycombed pattern may serve the purpose.

What I claim is:

1. A T-joint fitting comprising a housing having a first part and a second part, cooperating recesses in said parts which when said parts are fitted together form a cavity to receive a portion of a transport pipe, aligned bores in said first and second parts to receive fastening bolts on each side of said transport pipe, fastening bolts in said bores for clamping said first and second housing parts together with said pipe therebetween, an operating passage in said first housing part extending substantially transversely to the longitudinal axis of said transport pipe, an externally threaded portion on said first housing part extending colinearly with respect to said passage, a second passage communicating with said first passage and terminating in a portion of said first housing part adapted to receive a branch pipe, a piston member slidably disposed within said operating passage, a transverse flow passage extending through said piston member, a cutting means on the end of said piston member facing said pipe for cutting through the wall of said transport pipe when said piston is moved inwardly, a screw threaded bar on the opposite end of said piston member extending outwardly therefrom and coaxially with respect to said externally threaded portion, a packing of elastomeric material of sufficient size to be clamped between said first and second housing parts at the bolts clamping said housing parts about said transport pipe and to cover that part of said transport pipe fitting into the part of said cavity located in said first housing part, said packing having a waffle-textured surface on the side engaging said transport pipe, and an actuating means comprising a nut having an internal screw thread cooperatively engaging said externally threaded portion of said first housing part and an internal screw threaded bore cooperatively engaging said screw threaded bar, the screw threads of said bar and of said externally threaded portion having the same pitch, but being oppositely handed so that rotation of said nut onto said externally threaded portion displaces said piston member in said operating passage to cut through said packing and the wall of said transport pipe.

2. A T-joint fitting as claimed in claim 1 and further comprising a slot in the outer end of said threaded bar extending in a direction parallel to said transverse flow passage in said piston member, said piston member and operating passage being circular in cross-section so that said piston can be rotated by a tool engaging said slot and the position of said slot indicates the relative position of said transverse flow passage with respect to said second passage in said first housing member, and an o-ring seal on said piston member to seal said operating passage adjacent said threaded bar.

3. A T-joint fitting as claimed in claim 1 wherein said cutting means comprises a steel cap having a cutting edge thereon facing said pipe, and fastening means to attach said steel cap to said end of the piston member.

* * * * *